(12) United States Patent
Snyder et al.

(10) Patent No.: US 6,922,703 B1
(45) Date of Patent: Jul. 26, 2005

(54) METHODS AND APPARATUS FOR REAL-TIME PROJECTION AND RENDERING OF GEOSPATIALLY ORGANIZED DATA

(75) Inventors: Mark I. Snyder, Glendale, AZ (US); Gary Teskey, Glendale, AZ (US); Blake W. Wilson, Glendale, AZ (US); Matt Hilbert, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 536 days.

(21) Appl. No.: 09/661,674

(22) Filed: Sep. 14, 2000

Related U.S. Application Data (60) Provisional application No. 60/153,900, filed on Sep. 14, 1999.

(51) Int. Cl.[7] ............................................. G06F 17/00
(52) U.S. Cl. ................... 707/104.1; 707/101; 345/633
(58) Field of Search ................. 348/113–119; 345/7–9, 345/418–427, 619–623, 629–633; 707/101, 100, 104.1; 701/3, 300, 200, 208; 342/29, 36

(56) References Cited

U.S. PATENT DOCUMENTS

| | | | | |
|---|---|---|---|---|
| 4,876,651 A | * | 10/1989 | Dawson et al. | 701/200 |
| 5,381,338 A | * | 1/1995 | Wysocki et al. | 701/207 |
| 5,422,814 A | * | 6/1995 | Sprague et al. | 701/213 |
| 5,574,835 A | * | 11/1996 | Duluk et al. | 345/421 |
| 5,596,500 A | * | 1/1997 | Sprague et al. | 701/213 |
| 5,798,923 A | * | 8/1998 | Laskowski | 702/5 |
| 5,838,262 A | * | 11/1998 | Kershner et al. | 340/945 |
| 5,920,276 A | | 7/1999 | Frederick | |
| 5,978,715 A | | 11/1999 | Briffe et al. | |
| 6,021,374 A | * | 2/2000 | Wood | 701/301 |
| 6,023,278 A | | 2/2000 | Margolin | |
| 6,026,346 A | * | 2/2000 | Ohashi et al. | 701/210 |
| 6,047,227 A | * | 4/2000 | Henderson et al. | 701/50 |
| 6,085,129 A | | 7/2000 | Schardt et al. | |
| 6,088,654 A | * | 7/2000 | Lepere et al. | 701/301 |
| 6,092,076 A | * | 7/2000 | McDonough et al. | 707/102 |

(Continued)

FOREIGN PATENT DOCUMENTS

EP          0 763 714 A2      3/1997

OTHER PUBLICATIONS

Ianniello et al. "Airport Surface Collision Warning System Implementation". Proceedings of the IEEE–IEE Vehicle Navigation and Information Systems Conference, 1993. pp. 742–746. Oct. 1993.*

Glickstein et al. "Database Management for Integrated Avionics System". Proceedings of the IEEE 1992 National Aerospace and Electronics Conference. NAECON 1992. pp. 617–622, vol. 2. May 1992.*

Lohrenz et al. "The Compressed Aeronautical Chart Database: Support of Naval Aircraft's Digital Moving Map Systems". Position Location and Navigation Symposium, 1990. The 1990's–A Decade of Excellence in the Navigation Sciences. IEEE PLANS '90. pp. 67–73.*

European Searh Report; Application No. EP 00 30 8017; Jun. 22, 2001; Taylor P., Examiner; 2 pages.

*Primary Examiner*—Safet Metjahic
*Assistant Examiner*—Brian Goddard (57) ABSTRACT

Methods and apparatus are provided for real-time projection and rendering of one or more geospatially organized navigation databases. A system stores, processes, and displays a navigation database (including, e.g., terrain, navigation aids, obstructions, political boundaries, and the like) and avionics data to accomplish real-time display while maintaining correct projections of the data from latitude and longitude coordinates to Cartesian (nautical-mile) coordinates. Flight-plans may be graphically modified via an intuitive user interface.

9 Claims, 4 Drawing Sheets

U.S. PATENT DOCUMENTS

| | | | |
|---|---|---|---|
| 6,157,891 A | * 12/2000 | Lin | 701/301 |
| 6,163,749 A | * 12/2000 | McDonough et al. | 701/208 |
| 6,199,008 B1 | * 3/2001 | Aratow et al. | 701/120 |
| 6,208,284 B1 | * 3/2001 | Woodell et al. | 342/30 |
| 6,212,132 B1 | * 4/2001 | Yamane et al. | 367/180 |
| 6,219,592 B1 | * 4/2001 | Muller et al. | 701/9 |
| 6,246,960 B1 | * 6/2001 | Lin | 701/214 |
| 6,247,019 B1 | * 6/2001 | Davies | 707/103 R |
| 6,249,857 B1 | * 6/2001 | Klapman et al. | 712/34 |
| 6,308,132 B1 | * 10/2001 | Wilson et al. | 701/200 |
| 6,317,690 B1 | * 11/2001 | Gia | 701/301 |
| 6,453,235 B1 | * 9/2002 | Endo et al. | 701/211 |

* cited by examiner

METHODS AND APPARATUS FOR REAL-TIME PROJECTION AND RENDERING OF GEOSPATIALLY ORGANIZED DATA

CROSS-REFERENCE TO RELATED APPLICATIONS

This application claims the benefit of U.S. Provisional Patent Application Ser. No. 60/153,900, filed Sep. 14, 1999, the contents of which are hereby incorporated by reference.

BACKGROUND OF THE INVENTION

1. Technical Field

The present invention relates, generally, to data display systems and, more particularly, to methods for real-time display and editing of aircraft navigation and flight-planning data.

2. Background Information

Electronic instrumentation displays continue to advance in sophistication, achieving increasingly higher levels of information density and, consequently, presenting a greater amount of visual information to be perceived and understood by the operator. In many applications, it is critical that visual displays provide a proper cognitive mapping between what the operator is trying to achieve and the information available to accomplish the task. As a result, such systems increasingly utilize human-factor design principles in order to build instrumentation and controls that work cooperatively with human operators.

One area in particular that has experienced an increase in display complexity is the field of electronic flight system instrumentation. Accordingly, the Federal Aviation Administration (FAA) has promulgated a number of standards and advisory circulars relating to flight instrumentation. More particularly, Title 14 of the U.S. Code of Federal Regulations, Federal Aviation Regulations (FAR) Part 25, Sec. 25.1321 et seq. provides guidelines for arrangement and visibility of instruments, warning lights, indicators, and the like. Similarly, detailed guidelines related to electronic displays can be found in FAA Advisory Circular 20-88A, *Guidelines on the Marking of Aircraft Powerplant Instruments* (September 1985).

As instrument panel space is limited, achieving these goals can be quite difficult for designers faced with presenting a large amount of information within a relatively small space. As a result, cockpit displays tend to be populated with numerous, non-intuitive icons and symbols, and without the benefit of terrain, obstruction, political boundaries, and other useful display data. Methods are therefore needed in order to overcome these and other limitations of the prior art.

BRIEF SUMMARY OF THE INVENTION

The present invention includes systems and methods providing real-time projection and rendering of one or more geospatially organized navigation databases. In accordance with one aspect of the present invention, a system stores, processes, and displays a navigation database (including, e.g., terrain, navigation aids, obstructions, political boundaries, and the like) and avionics data to accomplish real-time display while maintaining correct projections of the data from latitude and longitude coordinates to Cartesian (nautical-mile) coordinates. In accordance with another aspect of the present invention, the system provides real-time display and editing of aircraft navigation and flight-planning data.

BRIEF DESCRIPTION OF THE SEVERAL VIEWS OF THE DRAWINGS

The subject invention will hereinafter be described in conjunction with the appended drawing figures, wherein like numerals denote like elements, and.

DETAILED DESCRIPTION OF PREFERRED EXEMPLARY EMBODIMENTS

Systems and methods in accordance with various aspects of the present invention provide real-time projection and rendering of one or more geospatially organized navigation databases. The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein.

Figure 1:
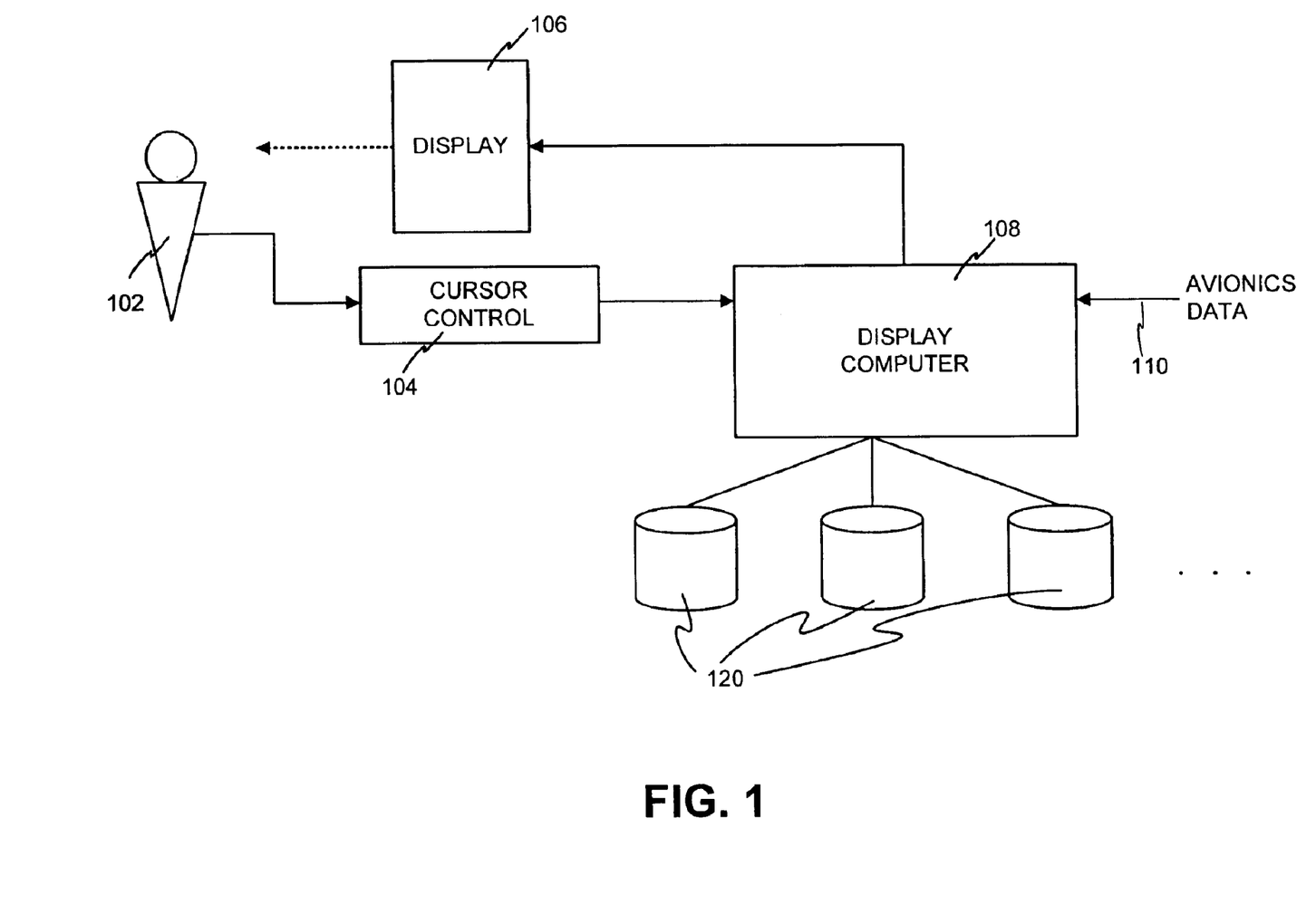
FIG. 1 is a schematic overview of a system in accordance with various aspects of the present invention.

Briefly, referring now to FIG. 1, a system in accordance with various aspects of the present invention comprises a display computer 108 communicating with an associated display or displays 106, one or more databases 120, cursor control device (CCD) 104, and avionics data 110. A user 102 (e.g., a pilot) provides input to display computer 108 through CCD 104, and receives visual feedback through display 106.

CCD 104 may include any suitable input device, for example, a mouse, trackball, touchpad, or the like. In one embodiment, CCD 104 comprises a touchpad having an associated button positioned for actuation by the user's thumb. Such devices are known in the art, and will not be described further herein.

Display computer 108 may include any number of hardware and/or software modules configured to carry out the various functions of the present invention. Similarly, display 106 may include any convenient monitor, screen, or other display unit capable of presenting a two-dimensional image perceptible by user 102, including, for example, various CRTs, flat-panel displays, and the like. Databases 120, which may include various types of data structures as described below, may consist of multiple physical storage/memory units, or may include a single physical storage unit separated into multiple logical databases.

Figure 2:
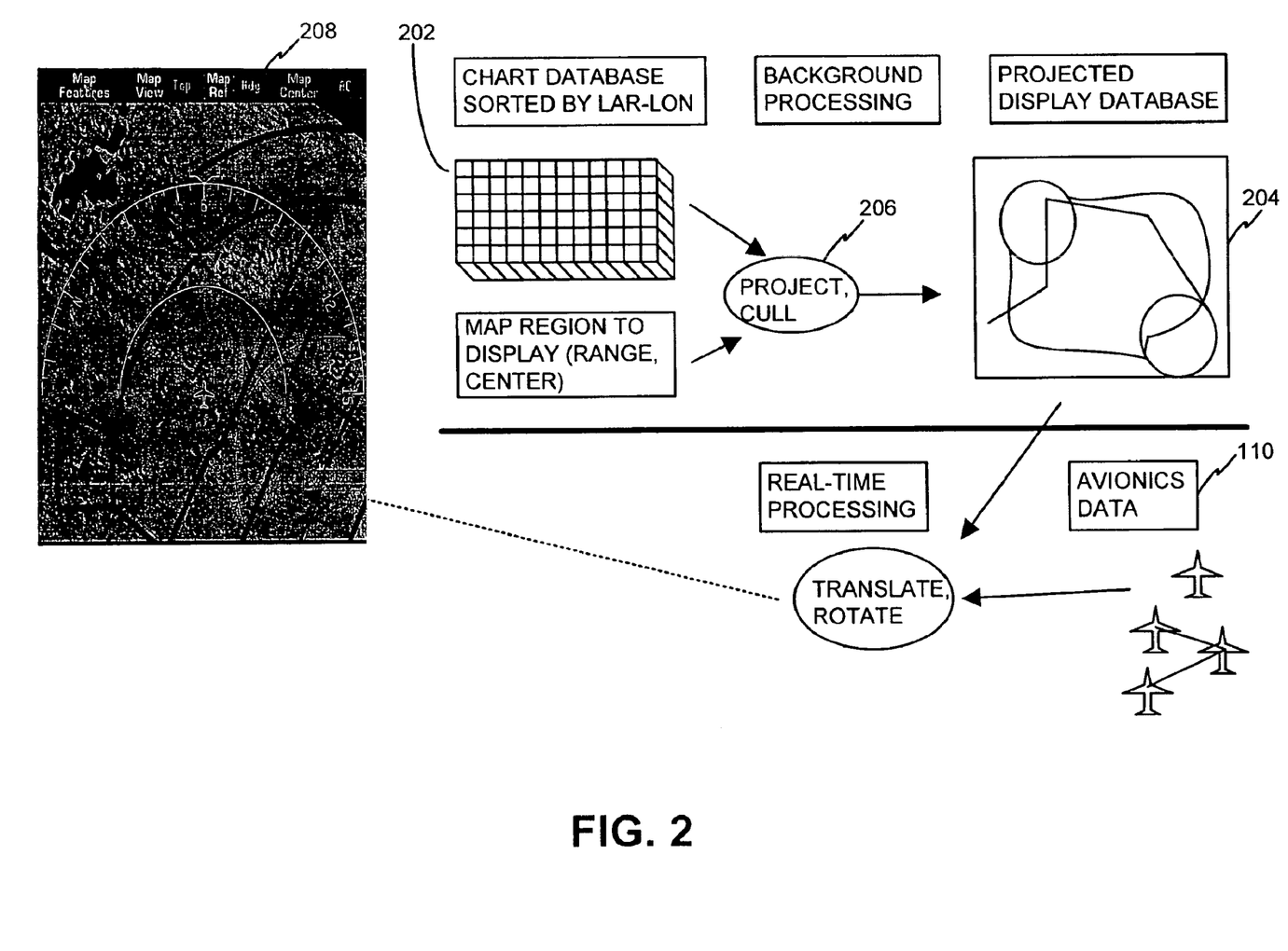
FIG. 2 is a schematic depictions of a system and process in accordance with one embodiment of the present invention.

Referring now to FIG. 2, in accordance with one aspect of the present invention, a system stores, processes, and displays a navigation database (including, e.g., terrain, navigation aids, obstructions, political boundaries, and the like) to accomplish real-time display while maintaining correct projections of the data from latitude and longitude coordinates to Cartesian (nautical-mile) coordinates. In a preferred embodiment, a portion of the data is stored in a geospatially organized data structure 202 and dynamically 'tiled' onto other data structures representing display elements projected into the display coordinate system, and culled to the currently displayed range (206). The new display data structure 204 is displayed using suitable graphics hardware and is translated and/or rotated to 'move' the display in real-time in accordance with avionics data 110. Background processing is preferably used to compute the next display tile, when required, for an uninterrupted map presentation 208. The result is a substantially seamless database-generated chart, including terrain, with correct map projections allowing overlay of other display information, such as FMS data. The chart preferably has the ability to maintain real-time update rates while displaying at low, medium, or high ranges.

Using the current flight plan display as a starting point, the system builds a full-featured, layered map with the active flight plan as the focal point of the presentation. The pilot is offered a virtual map that allows a flexible presentation of aeronautical data combined with an easy-to-use graphical interface.

The pilot preferably interacts directly with the map to modify flight plans through the use of cursor control device (CCD) 104. Flight plans can be modified while the pilot's attention is "head-up" without the use of the traditional "head-down" Multifunction Control Display Unit (MCDU). Full FMS control will be available via the combination of the CCD map interface and the MCDU. In this way, the present invention improves navigation, flight planning and situational awareness through advanced map display and control, graphical flight planning, and integrated display of aeronautical data.

A graphical interface with virtual buttons, pull-down menus, and dialogue windows is preferably used to control the map appearance and FMS. A graphical interface is used for most system controls. For example, pull-down menus will be used to control display modes and to configure the map. The menus utilize a mixture of selectable buttons and "radio" controls configured to show which choices are available, the status of the display choices, and the status of the controlled function once a choice has been displayed. The menus therefore intuitive to use without any "hidden" functionality that is not readily apparent to the pilot.

Windows containing selectable lists of items are preferably used where a relatively large number of items must be available for selection. In one embodiment, window "tabs" are included to allow multiple windows to occupy the same display space (one window at a time). Some windows are allocated dedicated display space on display 106 where particular information must be continuously available for pilot review. Windows may appear over one another temporarily, but information from the "lower" window(s) are preferably not viewable "through" the "upper" window(s). Windows have fixed and possible multiple sizes depending on flight operations.

The system unifies map and plan mode presentations into a virtual map with several available methods of choosing the portion of the map. A worldwide database (one of the databases 120) is preferably used to make all or substantially all of the earth's land surface available for display independent of the aircraft position or the active flight plan. The pilot is able to center the map on the aircraft, any waypoint in the flightplan, or any geographic location on the surface of the earth. The choices may be made from menus or by selecting the center directly on the map display.

The system provides a large increase in the number of items available for display. These items are a mixture of navigational, geographical and political items and are intended to improve the ability of the pilot understand the relationship between the aircraft, the intended flightplan and the surrounding physical and aeronautical environment.

In one embodiment, the map will consist of sets of layered information. The layers will be controllable via the graphical interfaces to build the most useful type of map dependent upon the needs of the pilot and current flight operations. At longer range settings, select display elements may be unavailable or will change in appearance.

The system is preferably capable of displaying the map from a variable perspective. That is, the angle of incidence between the pilot's view and the earth's surface may be set at an angle of less than 90 degrees. The pilot may be allowed to vary the angle of incidence between 0 degrees (vertical profile) and 90 degrees (lateral profile), therefore; allowing a "3D" view of the map.

Once a perspective view angle is set, the pilot will be able to select a single button to switch the lateral profile from a bird's-eye view to a perspective view. The pilot will also be allowed to vary the lateral and vertical perspective. This perspective flexibility will allow, for instance, the pilot to move the map center to the destination airport and then view the flightplan from any perspective. In this example, the complete approach procedure would be viewable and comparable to the surrounding geographic and aeronautical situation.

In accordance with one aspect of the present invention, one or more of the following items will be displayed in the lateral profile:

Active flightplan

Waypoints with tuning data, patterns and constraints

Flightplan offsets

Missed approach procedure

Navaids

Airports with tuning data

Special use airspace

Compulsory reporting points

Airways

Terrain

Airborne Weather Radar

TCAS targets

Lightning strikes

Approach, departure and arrival information

Geopolitical information

The intent of the lateral profile is to provide similar display elements as are found on approach plates, SIDs, and STARs. Depending upon the availability of data the system may add one or more of the following display elements:

Textual procedures and instructions

Complete procedure fixes with bearings and related instructions

Sector altitudes

Limitations on control and forecast areas will not be available, as we can not presently get them from navigation databases Minimums by aircraft category for straight-in and circle-to-land operations In addition to the lateral profile, the map display 106 will preferably include a vertical profile. In one embodiment, the vertical profile will be displayed below the lateral or perspective view. The long-term intent of the vertical profile will be to more closely imitate the presentation found on approach plates.

The display flexibility of the system allows a large number of different viewing options. To better manage these options, display choices will preferably be packaged into a limited number of standard display views. The views will be packaged to support flight operations.

The system allows the pilot to move the center of the map by moving the display mode to a "free center" mode. In this mode any portion of the earth's surface may be made the center of the map. In free center mode, a method will be provided to slew the map directly north, south, east or west. Aircraft and waypoint center modes will also be available and will operate as in current systems.

In one embodiment, the system displays flight plan transitions as curved paths from one flight leg to the next. The curved path including the end point of the curved transition where it joins the next leg will be calculated. For initial certifications, curved path display will apply only to the transition from the flight leg being flown to the next leg. In an alternate embodiment, the flight plan may be displayed as a sequence of curved paths.

Airways will be available for optional display under pilot command, and are preferably displayed with identifiers. In addition, one or more of the following airspace types may be displayed in a lateral view (as part of a navigation database 120):

Alert

Caution

Danger

MOA

Restricted

Prohibited

Training

Warning

Military Operation

In addition, one or more of the following navaid types will be available for display, including the identifier and frequency of each display:

NDB

VOR

DME

VORTAC/VORDME

Flight plan offsets and alternate flightplans are preferably displayed with the selected offset distance. Potentially, the alternate flightplans can be displayed as a complete flight plan drawn with clearly different symbology simultaneously with the active flight plan. The pilot would be allowed to turn this display function on or off via the menuing system.

Furthermore, the system will graphically and numerically display the set of maneuvers needed to execute procedure turns, holding patterns, and DME arcs. The published procedure turn will be available as a complete display element when the associated approach procedure is selected.

Complete ILS approach symbology is preferably available for display. This will include the following:

LS "feather"

Display missed approach procedures

ILS and LOC front and back courses

The following items may also be displayed, assuming that appropriate data sources can be secured:

Approach fixes including ICAO identifier, flight leg bearing, distance, and minimum altitudes Display miscellaneous approach instructions, if present (radar monitoring, DME use, etc.)

Display missed approached textual instructions for the missed approach procedure Airport maps will be available for display as an automatic and integrated feature of the virtual map. In one embodiment, the range is selectable such that the airport will be in full view and the aircraft position on the map will be accurately displayed during taxi operations. The runways are preferably displayed in a to-scale manner.

The aircraft position is suitably displayed over the airport map. As more accurate airport map data becomes available, the airport maps are preferably drawn as a collection of independent display elements instead of as a complete map picture.

In accordance with one embodiment, the appearance of the airport symbol will change based on displayed range. At higher ranges, the airport will appear as an icon. At lower ranges, the runways or the airport map will appear. The actual content of the airport map display will depend on the availability of the required data. For each airport, the system preferably display its identifier, name, country, and COM tuning data. In addition, the following runway data is preferably displayed: identifier and bearing, runway end elevations, and runway length.

The accuracy of the map image will likely be dependent on the integrity of the data supplied by the map supplier. If airport maps prove to be too inaccurate, limitations may have to be applied to the display of these maps.

The system will preferably host a full-time terrain display function. The purpose of this function is to provide full-time awareness of the aircraft situation relative to terrain. Access to a worldwide elevation database will be available to the terrain display function, and the MAU AGM will access the database and render a terrain display in two or three dimensions. Shading, texturing and lighting will be used to give a relief map appearance to the display.

Flight plans and other display elements are preferably drawn "over" the terrain. In one embodiment, full-time terrain will be the "lowest" layer in the map—that is, all other display elements will be shown "on the top" of the terrain. Display elements are preferably drawn such that all elements are substantially clear and unambiguous.

Obstacles will be displayed based on a published database man-made obstacles that are above a particular height (i.e., tall buildings, and towers). The obstacles will be displayed in a manner that will allow the pilot to determine the relative elevation of the obstacle compared to the surrounding terrain.

Figure 4:
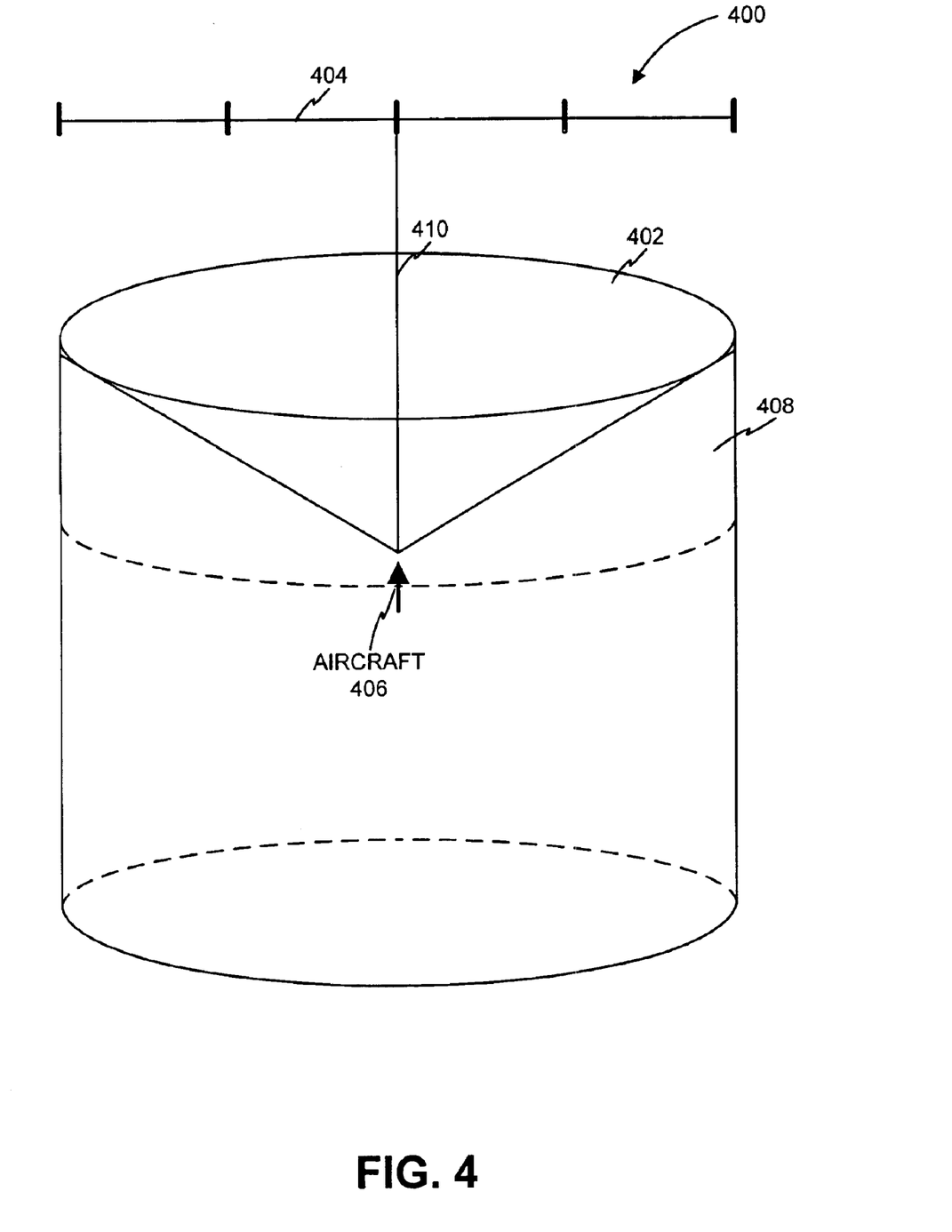
FIG. 4 shows an exemplary range cylinder display in accordance with various aspects of the present invention.

Referring momentarily to FIG. 4, a display in accordance with one aspect of the present invention includes a range-cylinder display 400. Range-cylinder display 400 suitably comprises a perspective range ring 402, heading tick-marks and bug 404, and an aircraft symbol 406. A color difference is preferably displayed between the top 1000 feet (or other appropriate distance) 408 of the range cylinder, and the top of the cylinder preferably corresponds to the projected altitude at the displayed range. A current heading indicator 410 is also included in the illustrated embodiment. Spoke symbols may also be displayed from the aircraft to the top of the range ring. The cylinder and spoke symbols preferably disappear into the terrain where the terrain geometry occludes them, visually depicting possible terrain collisions. This display effectively provides a conformal terrain presentation with visual situational awareness of terrain conflicts.

In general, the terrain display function will access a portion of the databases 120 based on aircraft position, displayed range, the active flightplan, and the center of the displayed area. The terrain display function preferably caches the terrain defined by the flightplan and the current position. This allows the terrain display to react with minimal lag to changes in the displayed terrain area.

There may be a lag when the terrain display function is first activated and the center of the display is moved to a geographic position that is not a part of the flight plan. This lag will preferably be no longer than one second in duration.

The system may also be configured to allow the display of a number of other items that will improve the pilot's awareness of the aircraft and flight plan situation, for example, political boundaries, rivers, lakes, and the like.

In one embodiment, lines of latitude and longitude will be displayed at the rate of one line for every 30° of arc. The numerical values will be written along the lines near the line intersections.

Weather radar output is preferably displayed as an integral layer of the map. The radar image is processed by display computer 108 and displayed "over" the terrain such that the pilot can view the radar image and the terrain image. The received radar image is stored in texture memory and then merged with the terrain and other displayed data. The radar image will be updated as a complete "patch" of data at the rate received from the radar subsystem, the radar image will not be "swept" as in current systems.

The radar image is preferably available in North-Up and Heading-Up modes to provide additional pilot awareness of the aircraft situation.

TCAS targets may also be displayed as a layer on the map. The pilot will preferably be able to control all TCAS system parameters via the CCD 104, wherein the targets will be distinguished by color and relative altitude.

The output from a lightning sensor may also be displayed as a layer of the map, wherein lightning strikes will be clearly displayed as a unique lightning symbol. Display control will be available for the pilot via the user interface. The system preferably allows the pilot to perform a number of flight planning operations without the use of an MCDU. For example, the following functions are preferably controllable graphically or through the use of windows:

- Creation and modification of primary and alternate flight plans
  - Creation of pilot-defined waypoints
  - Creation of custom waypoints
  - Insertion of waypoints in flight plan
  - Deletion of waypoints from flight plan
  - Insertion of published airways
- Insertion of complete stored flight plans (uplinked or saved)
- Insertion of complete published airways from the navigation database
- Selection of flight plan attributes (e.g., offsets)
- Selection of patterns at waypoints
  - Holding Pattern
  - Direct To
  - Vertical Direct To
  - Flyover
  - Orbit
  - Radials
  - Intercept
- Selection of waypoint attributes
  - Speed (CAS and/or MACH)
  - Altitude (at or above, at or below, etc.)
  - Descent Angle
- Selection of flight operations in terminal areas
  - Approaches
  - SIDS
  - STARS
- Nav and Coin Tuning In this regard, the system preferably provides a waypoint list function that displays the complete list of waypoints in the active flightplan. Either the graphical interface or the waypoint list may be used to choose a waypoint for addition to or deletion from the flightplan.

SID, STAR and Approach procedures may also be available for display. The system will make the list of procedures available for review based on the airport selected as a part of the flightplan. The procedures will be available in an alphanumeric list with associated transitions, if any. The pilot may select individual procedures for graphical preview. The graphical preview will be differentiated from the active flightplan and will show all relevant portions of the procedure. The viewed procedure may be inserted as a complete part of the flightplan through the use of an "Add Procedure" function.

As is known, weather providers produce representations of precipitation and other information that is not in a standard image format. This data is assembled from one or more sites (dependent on range) and can be displayed without ground data. The system may be configured to interpret the data to form a picture that can be merged with terrain and other display elements. The source data includes latitude and longitude so that it may be displayed as a layer in the Interactive Navigation map. Potentially, multiple data types (as listed above) could be layered within a single navigational mode.

Databases 120 may include, for example, one or more of the following:

- Airways
- NAVAIDS
- Symbol textures
- Nav data
- Obstructions
- Font textures
- Taxi registration
- Special Use Air
- Political Boundaries
- COM frequencies (enroute and airports)
- More approach info (e.g., missed approach text)

It will be understood that this list is merely examplary, the present invention is not so limited.

In accordance with an enhanced terrain function, the AGM will provide graphics generation for the terrain display and receives inputs from a TAWS product. That is, the terrain display function preferably receives data from the TAWS function indicating which geographic areas are potential threats to the aircraft, transmit the following concerning the affected areas: (1) Geographic area to be displayed as an alert, and (2) the color of alerting area (yellow or red).

The geographic data is preferably supplied in WGS84 referenced latitude and longitude. The geographic area will be defined as a set of polygons. Each polygon defines one contiguous geographic area to be set to a single color. Each polygon will have the latitude and longitude of each vertice defined, and the terrain display function will use the polygon data to set the color attribute of the defined alert areas.

In one embodiment, the display system will assume that the red areas have priority, and therefore the red areas will be drawn "over" the yellow areas where necessary.

The data may be supplied at any appropriate rate, e.g., a rate equal to the update rate of the terrain data while in a heading-up mode (e.g., 15 Hz).

The physical interface used to transmit any elevation data to the terrain display function is preferably capable of supporting the required update rates of the terrain display or other integrated functions. The required data rates will be dependent upon the exact nature of the integration.

The integration requiring the most capable physical interface would be one where the terrain display function receives all its elevation data from the TAWS product. The terrain display function would request transfer of sections of terrain elevation based on position, altitude, airspeed, etc. The TAWS product would transfer files of elevation data larger than that required for a single displayed frame of data. The file size and speed with which the terrain display function must respond to input changes may necessitate the implementation of a high-bandwidth interface such as Ethernet.

The terrain will be drawn using VFR sectional chart color schemes. The latitude and longitude of the displayed map area will be used to extract elevation data from the database. The elevation will become an index into a color table. The exact color will also be set by the application of coloring and shading algorithms dependent upon the orientation of each terrain element. See, e.g., Table 1 for just one possible implementation of these color schemes.

The terrain is preferably be drawn with a map projection that conforms to that used by the FMS. The terrain database is, for example, referenced using WGS 84 standard latitude and longitude. The terrain map will be rendered to allow all other display elements to be accurately positioned over the terrain. Mapping may be performed using any convenient mapping algorithm, for example, the Lambert Conformal Conic method.

Figure 3:
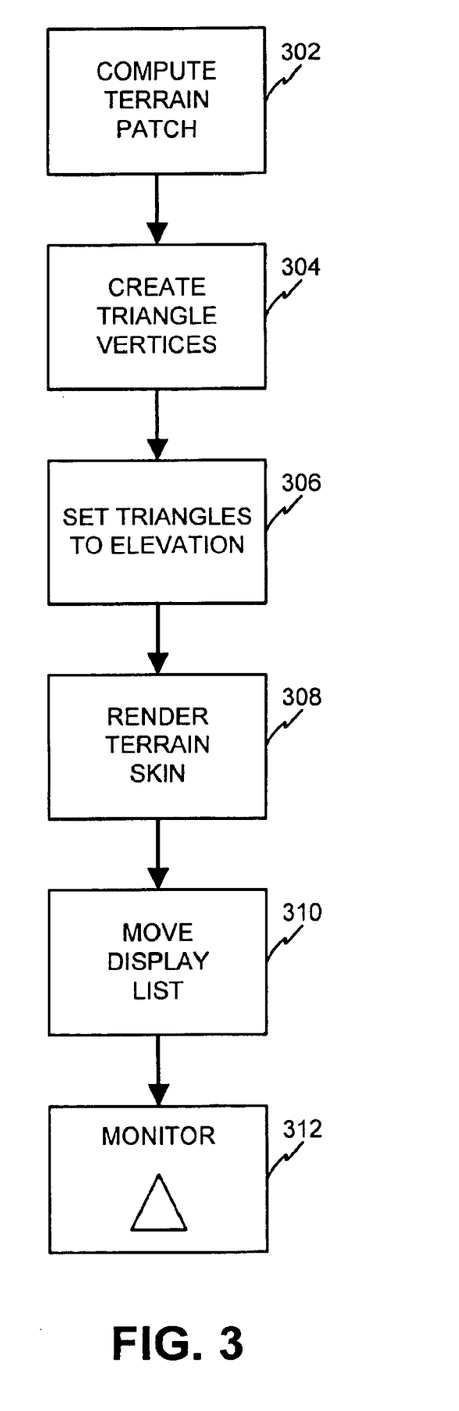
FIG. 3 is a flowchart showing an exemplary method of computing terrain patches.

Terrain paging may be performed in accordance with the exemplary flowchart shown in FIG. 3. It should be understood that the exemplary process illustrated may include more or less steps or may be performed in the context of a larger processing scheme. Furthermore, the various flowcharts presented in the drawing figures are not to be construed as limiting the order in which the individual process steps may be performed.

First, in step 302, the system will compute the size of a terrain patch required to cover the screen (in Lat-Lon coordinates). The terrain database will be sampled at even increments to create a triangle grid with a fixed number of triangles (regardless of range). Next, in step 304, the triangle vertices will be created by projecting the sampled vertices from the LAT/LON coordinate frame to nautical-mile based coordinate frame using, for example, Sedono's equations and a map reference point. The triangles are then set at their correct elevation (a 3D mesh) and normals and colors are computed (step 306). Next, in step 308, the resulting terrain skin is rendered to a display list, or stored geometry description. The entire display list is then moved (in real time) by computing movement from the map reference point to the actual map center (such as the AC) using Sedono's equations again and then translating/rotating the geometry to present heading/north up views (step 310). The system then monitors the difference between the projected map center and the actual map center and re-run the algorithm (in a background task) when required to keep terrain covering the screen. When a new skin is ready, the display list swaps to the new skin. When a large jump is performed, such as a recenter, the system computes a low-resolution skin to prevent a black background while the high resolution skin is computed. (step 312). Similar processes may be used to render the chart data into display lists for faster real-time display (except text, which must be re-rendered every frame to keep it facing upward).

The terrain data, as used in Interactive Navigation, comes from the National Geodetic Survey via NOAA. In one embodiment, the data arrives in two resolutions, 30 arc-second, and three arc-second Digital Elevation Model (DEM). The 30 arc second data, GTOP3O, was may be supplied on five CD's including the whole earth as 33 tiles. These tiles are provided as a list of 16 bit short integers, in the wrong byte order (little endian), and from south to north (also wrong order). The data can then be combined into a single huge (1.7 Gig) file using any convenient method. The data is then broken into tiles again, this time of varying sizes and formed into new right order DEMs. While the original files gave equal weight to the data in the middle of the ocean as to useful data, the new files are sized to cover the land masses only thus reducing the data requirement from some 1.7 Gig to 0.6 Gig.

The three arc second data may be downloaded from the Internet address as follows: http://edcwww.cr.usgs.gov/glis/hyper/guide/1_dgr_demfig/index1m.html These files are ASCII DEMs covering an area of one minute by one minute. The original files are converted from the ~200 Mbytes/file to a tighter binary 2.7 Mbyte file. The order of the original data is south to north, west to east (column first row last). The data is then ordered west to east, north to south (row first column last), as with the 30 arc second data.

Each of these files preferably appended with a trailer, which describes the format of the data. The trailer is read only during startup, is placed on the end of the file so that it need not be actively skipped during program execution. The trailer is of the following format:

| | |
|---|---|
| Float nlat; | // Northern most latitude in file |
| Float slat; | // Southern most latitude in file |
| Float wlon; | // Western most longitude in file |
| Float elon; | // Eastern most longitude in file |
| Short resolution; | // Number of points/degree of Latitude/longitude |
| Short rastersize; | // Number of bytes per row of data |

In the illustrated embodiment, the entire earth's land surface is described by an elevation database that covers the land areas in large tiles at the minimum resolution. The following describes the content of each tile:

1. The tiles are aligned with integer numbered lines of latitude and longitude described by north and south latitudes, east and west longitudes, and the center latitude/longitude.
2. The number of posts per row (longitude) is included.
3. The post resolution posts per degree) is included (row and column spacing).
4. Each post is a two-byte elevation value based on that obtained from the source.

The tiles should be sorted by center distance to the current center of the displayed map. This will facilitate searches for new tiles.

It will be appreciated that other methods of creating terrain data may be employed, and that a variety of other data structures may be appropriate. Furthermore, those skilled in the art will recognize that the exact hardware configuration used for the various modules that included in display computer 108 (e.g., microprocessors, storage, RAM, interface cards, and the like) may be selected and optimized based upon the particular design goals.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A method for displaying navigational data associated with an aircraft on a display having a display coordinate system, said method comprising the steps of:

providing one or more databases, each database including navigational data stored as geospatially organized data structures that include data representative of latitude and longitude coordinates;

retrieving data from one or more of said databases;

dynamically tiling the retrieved data onto one or more other data structures that represent display elements projected into the display coordinate system;

culling the dynamically tiled data to a current display range, to thereby generate display into the display data structures;

updating, in real-time, a projected display database that includes the generated display data structures and that substantially maintains correct projections of the dynamically tiled and culled data from latitude and longitude coordinates to Cartesian coordinates;

modifying said display database in accordance with avionics data associated with said aircraft; and displaying said display database in accordance with said modifying step.

2. The method of claim 1, further comprising the step of unifying map and plan mode presentations into a virtual map.

3. The method of claim 1, further comprising the step of simultaneously displaying at least two profiles.

4. The method of claim 1, further comprising the step of displaying a map from a variable perspective, wherein the angle of incidence between the pilot's view and earth's surface is set at an angle of less than ninety degrees.

5. A display system comprising:

a cursor control device (CCD) configured to accept input from a user;

a display computer coupled to said CCD and configured to process avionics data and said input from said user, wherein said display computer is further coupled to a display having a display coordinate system and at least one database including navigational data stored as geospatially organized data structures that include data representative of latitude and longitude coordinates;

said display computer further configured to:

dynamically tile data retrieved from the at least one database onto one or more other data structures that represent display elements projected into the display coordinate system;

cull the dynamically tiled data to a current display range, to thereby generate display data structures;

update, in real-time, a projected display database that includes the generated display data structures and that substantially maintains correct projections of the dynamically tiled and culled data from latitude and longitude coordinates to Cartesian coordinates;

modify said display database in accordance with avionics data associated with an aircraft; and display said display database in accordance with said modifying step.

6. The system of claim 5 wherein the display computer is configured to display a map from a variable perspective.

7. The system of claim 5, further comprising a map of layered information, wherein said layers are controllable via graphical interfaces.

8. The system of claim 5, wherein said CCD is a graphical user interface.

9. The system of claim 5, wherein said display is configured to display flight plan transitions as curved paths from one flight leg to the next.

* * * * *